Dec. 15, 1942. F. C. ALBERS 2,305,127
PRINTING DEVICE
Filed Feb. 3, 1941
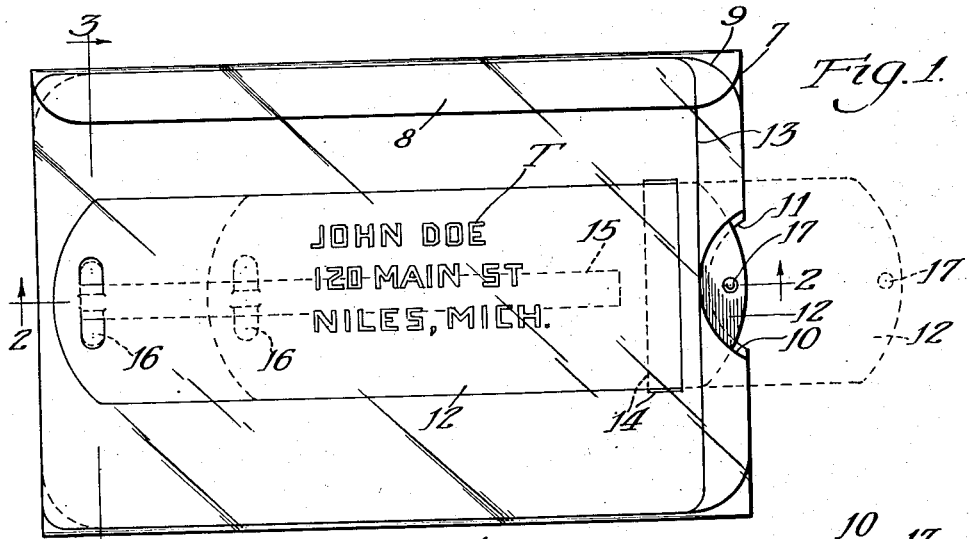
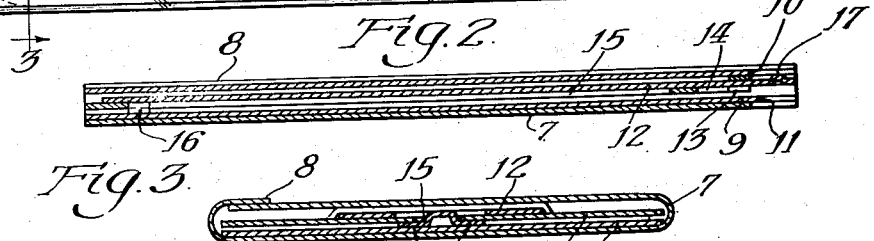
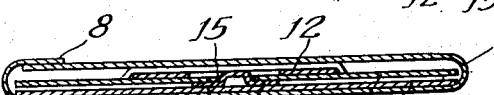
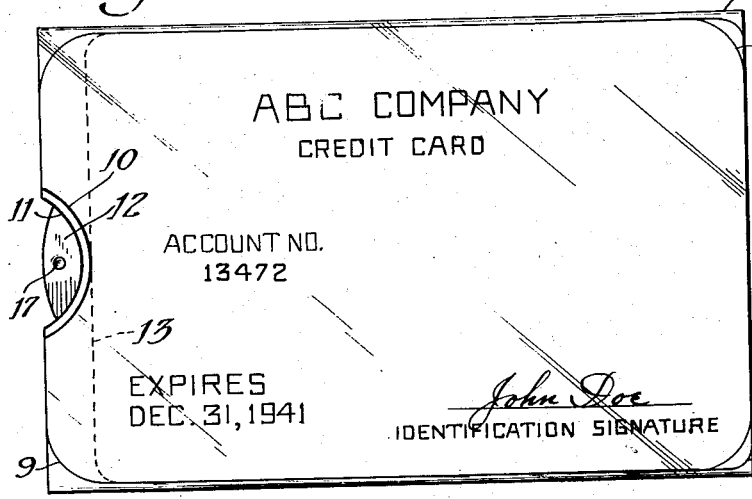
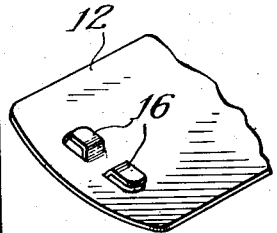
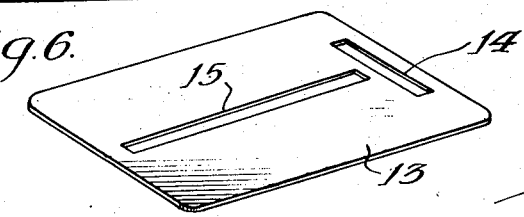
Inventor:
Frederick C. Albers.
By Wallace & Cannon
Attorneys Patented Dec. 15, 1942

2,305,127

UNITED STATES PATENT OFFICE 2,305,127

PRINTING DEVICE

Frederick C. Albers, Floral Park, N. Y., assignor to Addressograph-Multigraph Corporation, Cleveland, Ohio, a corporation of Delaware Application February 3, 1941, Serial No. 377,076

5 Claims. (Cl. 101—369)

This invention relates to printing devices of the kind from which data, such as a name and address or the like and related to other data borne by the device, may be printed.

It is usually desirable to insure accurate addressing and the like of business or kindred instruments prepared in transactions conducted pursuant to identification or like data and to this end, one of the primary objects of my invention is to enable an address or the like to be printed from suitable printing means associated with identification or like data pursuant to which a transaction entailing the address or the like is conducted.

By way of example, a memorandum or the like is usually prepared when a commercial air line ticket is delivered without an attendant cash payment therefor and in such an instance, involving in effect an extension of credit, data have been manually copied onto the memorandum or the like from the carrier of an identification, commonly referred to as a credit card and which constitutes an authorization for such conduct of the transaction. A similar procedure is sometimes followed in other transactions involving, for example, an extension of credit and sales by department stores and retailers of petroleum and related products and kindred transactions where merchandise is delivered without an attendant cash payment are exemplary as is the preparation of time cards and the like from employee identifications in factories and other industrial enterprises. In such instances, of which it is to be understood that the foregoing are merely examples, there is an identification, usually subject to being renewed or replaced from time to time, and data are manually copied from the carrier of such identification which gives rise to the possibility of error. This, of course, may be avoided, as stated heretofore, by providing means in association with the identification or the like from which the data may be printed so as to thereby insure accurate transcription and avoid errors such as might arise if the data were manually copied.

However, in instances such as those referred to hereinabove and in kindred instances, it is usually desirable that the identification or the like, with which printing means is to be associated in accordance with this invention, be capable of being renewed or replaced for usually such an identification or the like is issued to be valid for but a stated period. Hence, still another object of this invention is to detachably associate printing means with means affording an identification, authorization or the like so as to enable use of the printing means with different means affording an identification, authorization or the like, and a related object is to utilize relatively permanent printing means along with relatively inexpensive and readily replaceable means affording an identification, authorization or the like. Devices of the character to which this invention pertains and including printing means and an identification, authorization or the like will usually be carried about by the person entitled or required to use the same and such devices may be carelessly handled. Furthermore, the portion of the device affording the renewable or replaceable identification, authorization or the like may be advantageously afforded as a paper card or the like that will be subject to deterioration. Hence, another object of the invention is to provide a protective enclosure for various elements of the device, and an ancillary object, since it may be frequently desirable to have the identification, authorization or the like part of the device available for ready inspection, is to enable a transparent enclosure to be utilized.

Furthermore, in many instances the printing means of a device of the present invention may have ink applied thereto and it is also desirable that such means be protected against damage while not in use and therefore yet another object of this invention is to support the printing means for limiting movement to and from the enclosure portion of the device to thereby enable the printing means to be enclosed when not in use and consequently prevent ink applied to such means from soiling the clothing or hands of a user of the device and yet enable such printing means to be readily exposed when an impression is to be made therefrom.

More specifically, the objects of this invention are to removably retain means affording an identification, authorization or the like in a protective enclosure therefor; to so retain means affording printing means in an enclosure therefor that such means may be moved relative to the enclosure to expose the printing means and yet not be detached from said enclosure; to enable expeditious replacement of either means affording an identification, authorization or the like and means affording printing means independently or concurrently; to provide a device, affording an identification, authorization or the like and also printing means, of simple and economical construction and which will be efficient and positive in use.

Other and further objects of the present invention will be apparent from the following description and claims and are illustrated in the accompanying drawing which, by way of illustration, shows a preferred embodiment and the principle thereof and what I now consider to be the best mode in which I have contemplated applying that principle. Other embodiments of the invention embodying the same or equivalent principle may be used and structural changes may be made as desired by those skilled in the art without departing from the present invention and the purview of the appended claims.

In the drawing,

Fig. 1 is an elevational view of one face of a device embodying my invention;

Figs. 2 and 3 are sectional views taken substantially and respectively on the lines 2—2 and 3—3 on Fig. 1, looking in the direction of the arrows on said lines;

Fig. 4 is an elevational view of the face of the device opposite that shown in Fig. 1;

Fig. 5 is a fragmentary perspective view of one end of the printing plate embodied in the device shown in Fig. 1; and Fig. 6 is a perspective view of the support provided for the printing plate.

The device as illustrated in the accompanying drawing embodies an enclosure 7 that may be formed from any suitable material which will effectively resist mutilation, but desirably, in most of the uses to which the device of this invention will be put, the enclosure or carrier 7 is formed from a substantially rectangular sheet of transparent plastic material or the like that is folded upon itself into substantially U-shaped formation thereof is of greater length than the other whereby the resultingly extended marginal portion as 8 thereof may be folded over onto the outer face of the shorter of the limbs and adhesively or otherwise suitably secured thereto. This results in the formation of an envelope or sleeve into which the other elements of my novel device may be inserted so as to be effectively protected by the enclosure or carrier thus afforded.

Among the transparent plastic materials or the like from which the transparent sheet, that is formed into the enclosure or carrier 7, may be produced is cellulose acetate but other synthetic material, for example, one of the vinyls, as polyvinyl acetate-chloride and also methyl methacrylate and ethylene benzene may be used, if desired. In any event whether or not the sheet is produced from a transparent plastic material, it should possess sufficient rigidity to be self-sustaining and it should be of such a nature that the enclosure or carrier formed therefrom will not readily tear or be subject to objectionable deterioration.

As explained hereinabove, one of the elements of the novel device of my invention is to afford an identification, authorization or the like and, as a result, such an element will bear data such as the name of the company issuing or providing the device, an expiration date beyond which the device is not to be valid and an arrangement whereby identification of the user may be assured, such as the provision of a place whereat the user of the device may place his signature to enable comparison thereof with signatures made on other business instruments or the like prepared by the use of the device of the present invention. An account, serial or employee number or the like may also be included on the element affording the identification, authorization or the like. In the event the carrier 7 is made of transparent material, it will be desirable to include data of the aforesaid nature on one face of the element provided for the reception of the same so that when the element is inserted into the enclosure or carrier 7, such face of the element may be faced toward one of the transparent walls of the carrier whereby the data will be visible through such transparent wall for so to do enables the data to be ascertained without removal of the element from the carrier.

Since it is desirable that the element affording an identification, authorization or the like be readily renewable or replaceable, it may be desirable to use a paper or cardboard card as 9 on which the aforesaid or other data may be printed or otherwise incorporated thereon. In any event the element, as the card 9, will be so sized that it will be readily slid into or removed from the enclosure or carrier 7. Hence, the card as 9 or the like will be of an outline complementary to the outline of the sleeve or carrier 7 but of a size sufficiently smaller to permit ready insertion and removal thereof into and from the carrier.

In order to facilitate insertion and removal of the card as 9 or the like into and from the carrier 7, notches as 10 are desirably formed in the medial part of the marginal portion along one of the shorter edges of the substantially rectangular carrier 7 and, for a purpose to be explained hereinafter, a similar but smaller notch 11 is provided in the card 9 so that a portion of the card will be exposed at the notches 10, for an arrangement of this character facilitates insertion and removal of the card as 9 into and from a carrier as 7.

While a wide variety of printing means may be incorporated in a device of the character to which this invention pertains, I have illustrated in the accompanying drawing a sheet metal plate 12 that is substantially rectangular in outline and it may desirably have the shorter ends thereof formed on a radius as shown in the accompanying drawing. When a metal plate as 12 is provided, type characters as T may be embossed thereon in a suitable embossing machine of which that disclosed in Duncan Patent No. 1,518,904, patented December 9, 1934, is exemplary. Such type characters may be embossed in the plate as 12 to appear in relief on one face of the plate and in intaglio on the opposite face. Desirably when this is done, the outwardly disposed faces of the portions of the type characters appearing in relief will afford printing surfaces to which ink may be applied as by arranging an ink ribbon between such type characters and the sheet on which an impression is to be made. When the type characters are arranged in this manner, the relief portions thereof will need be read in reverse of the ordinary reading but the intaglio faces of the type characters may be read in an ordinary manner.

In some instances it may be desirable to so emboss type characters on a metal plate as 12 that the relief portions thereof may be read in an ordinary manner and where resort is had to this arrangement, the plate as 12 will be arranged in a suitable printing machine in such a way that the plate will be disposed on one side of the sheet on which an impression is to be made, and a suitable inking means, such as an ink ribbon, will be disposed on the opposite face so that when pressure is applied to squeeze the sheet between the ink ribbon or the like and the type characters, an impression will be made on the sheet.

In those instances where it is desirable that a number of copies be made in each impression operation from type characters embossed on a plate as 12, carbon paper or the like may be associated with the various sheets in the manner well understood in the art so that when pressure is applied an impression will be made on the various sheets.

Particularly in those instances where ink is to be directly applied to type characters as T embossed on a plate as 12 or other printing means, such as a paper stencil or the like afforded in a device of the character to which this invention pertains, it is advantageous to enable the printing means to be enclosed when not in use for this prevents soiling of the hands or clothing of the user of the device. Moreover, in most instances it is desirable that the printing means be protected against damage when not in use. Hence in accordance with this invention, the printing means is arranged in such a manner that it may be enclosed within the carrier 7 when not in use but may readily be exposed when it is desired to make an impression therefrom.

Hence, in the present instance a support 13 is provided that is desirably of an outline complementary to the outline of the enclosure or carrier 7. However, such a carrier will advantageously be shorter in its longer dimension than the longer dimension of the carrier 7 so that when the support 13 is mounted within the enclosure or carrier 7 the adjacent end of the support may be disposed within the carrier 7 beyond the inner end of the notches as 10 so as not to be exposed in said notches. In the present instance the support 13 has a transversely extending slot 14 therein adjacent the end thereof that is to be disposed in juxtaposition to the notches 10 when the support 13 is mounted in the carrier 7. A longitudinally extending slot 15 is also provided in the support 13 substantially midway between the longer edges thereof, and this slot terminates in spaced relation with the slot 14 and the opposite end of the support 13. Preferably the support 13 is made of flexible material such as cardboard or the like so that it may be flexed to enable lugs as 16, or other suitable connecting means, on the printing plate as 12 to be inserted into the slot 15. As best shown in Fig. 5, the lugs as 16 are struck up from the plate 12 adjacent what is to be the inner end thereof, and these lugs are so formed as to include portions which extend in substantially parallel relation with, but which are spaced from, the adjacent face of the plate 12, the spacing of such portions of the lugs 16 being sufficient to neatly accommodate the support 13 between such portions and the adjacent face of the plate 12.

In assembling the printing plate 12 on the support 13 the face of the plate 12 having the lugs 16 extending therefrom is laid onto the support 13 and the end of the plate 12 that is to constitute the outer end thereof is passed through the slot 14, which is preferably sized so as to neatly accommodate the plate therein and which affords a guide for said plate in the permissive movement thereof. The plate 12 is then passed through the slot 14 until the lugs 16 are brought into alignment with the slot 15 and then the support 13 is suitably flexed so as to enable the lugs 16 to be passed through the slot 15, and this so interconnects the plate 12 and the support 13 that the plate 12 is movable relative to the support 13 in the amount determined by the length of the slot 15. The end of the slot 15 adjacent the end of the support 13 opposite that near which the slot 14 is provided is preferably so spaced from the end of the support that when the support 13 is mounted in the carrier 7 adjacent the card 9 therein and the end of the support 13 opposite that whereat the slot 14 is located is arranged in substantial alignment with the end of the enclosure or carrier 7 opposite that at which the notches 10 are provided, and the lugs 16 are disposed at the adjacent end of the slot 15, then the end of the printing plate 12 opposite that at which the lugs 16 are provided is disposed in the notches 10 and 11. Preferably an embossure or the like as 17 is provided in the portion of the plate 12 so disposed in the notches to facilitate gripping of the plate. It will be understood that the foregoing is but one of the ways in which a printing means as the plate 12 may be mounted in an enclosure as 7 for limited movement relative to the enclosure.

Preferably the card 9 and the support 13 are neatly embraced in the enclosure 7 in such a way that these elements will be retained in the enclosure or carrier when the exposed end of the plate 12 is grasped so as to move the plate into its exposed position into which it has been partly moved in the position in which it is shown in broken lines in Fig. 1. The type characters T are so embossed on the plate 12 that when the lug 16 engages the end of the slot 15 adjacent the slot 14, all of the type characters on the plate 12 will be exposed beyond the end of the carrier 7 whereat the notches 10 are provided and therefore the plate 12 may be readily placed in a suitable printing machine so as to permit an impression to be made therefrom.

When the carrier 7 is made of transparent material, the type characters T are desirably embossed on the plate 12 or are so provided on other equivalent printing means that they may be read in an ordinary manner through the adjacent transparent wall of the carrier 7, the support as 13 and the plate as 12 preferably being arranged in the enclosure 7 so as to have the plate or other printing means disposed next to the adjacent of the carriers. When the type characters T are embossed on the plate 12 in such a way that ink is to be directly applied to the relief surfaces thereof, these relief faces of the type characters will be disposed toward the adjacent face of the support 13 for so to do will expose the intaglio faces of the type characters through the transparent wall of the carrier or enclosure and enable direct reading of the type characters as aforesaid.

It is to be understood that in some instances it will be desirable to afford the identification or like data directly on the support as 13 in which event the elements identified as 9 and 13 in the accompanying drawing will be combined in a single unit. In any event, however, the arrangement is such that the printing means as the printing plate 12 constitutes a relatively permanent part while the element bearing the identification and like data, whether this be a card as 9 or a support as 13 bearing such data, constitutes a transitory part which can be removed and inexpensively replaced from time to time. Furthermore, while the enclosure or carrier as 7 may be expeditiously made of transparent material, it will be understood that this is not essential since the other elements are arranged therein to be readily removable therefrom when the need so to do arises. It will be understood that if the identification and like data is provided directly on the support as 13, then such support will be sized similarly to the card as 9 and will desirably include a notch as 11.

It is to be understood that hereinabove I have illustrated and described but a preferred embodiment of my invention and that this is capable of variation and modification and I therefore do not wish to be limited to the precise details set forth but desire to avail myself of such changes and alterations as fall within the purview of the following claims.

I claim:

1. A printing device embodying an enclosure having an open end, printing means, a support element in said enclosure for said printing means and neatly embraced in said enclosure, said support element having a slot therein extended toward the open end of said enclosure, and means on said printing means extended into said slot and slidably engaged with the side edges of said slot to connect said printing means to the support element and cooperating with said slot to guide said printing means and to permit limited movement of said printing means outwardly through the open end of said enclosure.

2. A printing device embodying an enclosure having an open end, printing means, a support element in said enclosure for said printing means and neatly embraced in said enclosure, said support element having a slot therein extended toward the open end of said enclosure and having a second slot therein adjacent the open end of said enclosure and extended transversely of the first slot and sized to slidably accommodate said printing means and affording a guide therefor, and means on said printing means extended into the first slot and slidably connecting said printing means to the support element and arranged to permit limited movement of said printing means outwardly through the open end of said enclosure.

3. A printing device embodying an enclosure having an open end, printing means, a support element in said enclosure for said printing means and neatly embraced in said enclosure, said support element having a slot therein extended toward the open end of said enclosure and terminated in spaced relation with the open end of said enclosure, means on said support element intermediate the end of said slot spaced from the open end of said enclosure and said end of said enclosure and adapted to slidably accommodate said printing means to afford a guide therefor, and means on said printing means extended into said slot and slidably connecting said printing means to the support element and arranged to permit limited movement of said printing means outwardly through the open end of said enclosure.

4. A device of the class described embodying an envelope-like enclosure having an open end, printing means, a support element in said enclosure for said printing means, means slidably connecting said printing means to said support element whereby said printing means may be moved outwardly through the open end of said enclosure, and removable means in said enclosure adapted for the reception of data to thereby afford an identification, authorization or the like, the walls of said enclosure at the open end thereof and the adjacent part of said removable means having aligned notches therein in which the adjacent end of said printing means is exposed when said printing means is inserted into said enclosure to thereby facilitate withdrawal of said printing means from said enclosure, the notches in the walls of said enclosure being larger than the notch in said removable means whereby the marginal portion about the notch in said removable means is exposed in the notches in said walls whereby to facilitate removal of said removable means from said enclosure.

5. A device of the class described embodying a transparent envelope-like enclosure having an open end, printing means, a support element in said enclosure for said printing means, means slidably connecting said printing means to said support element whereby said printing means may be moved outwardly through the open end of said enclosure, said connecting means being constituted and arranged to enable but limited movement of said printing means inwardly and outwardly through the open end of said enclosure, and removable means in said enclosure adapted for the reception of data to be visible through said transparent enclosure to thereby afford an identification, authorization or the like, the walls of said enclosure at the open end thereof and the adjacent part of said removable means having aligned notches therein in which the adjacent end of said printing means is exposed when said printing means is fully inserted into said enclosure to thereby facilitate withdrawal of said printing means from said enclosure, the notches in the walls of said enclosure being larger than the notch in said removable means whereby the marginal portion about the notch in said removable means is exposed in the notches in said walls whereby to facilitate removal of said removable means from said enclosure.

FREDERICK C. ALBERS.